United States Patent
Schlang et al.

[11] Patent Number: 5,963,852
[45] Date of Patent: Oct. 5, 1999

[54] DUAL BAND MOBILE STATION

[75] Inventors: Jeffrey A. Schlang, Raleigh; Ronald D. Boesch, Morrisville, both of N.C.

[73] Assignee: Ericsson Inc., Research Triangle Park, N.C.

[21] Appl. No.: 08/823,068

[22] Filed: Mar. 24, 1997

[51] Int. Cl.$^6$ .................................................. H04B 1/40
[52] U.S. Cl. ........................................ 455/76; 455/552
[58] Field of Search ............................ 455/76, 83, 84, 455/86, 188.1, 180.1, 552, 553, 550, 85

[56] References Cited

U.S. PATENT DOCUMENTS

| | | | |
|---|---|---|---|
| 4,223,406 | 9/1980 | Someno | 455/180.1 |
| 4,419,768 | 12/1983 | Yamashita et al. | 455/180.1 |
| 4,476,583 | 10/1984 | Muterspaugh | 455/180.3 |
| 5,410,747 | 4/1995 | Ohmagari et al. | 455/118 |
| 5,465,409 | 11/1995 | Borras et al. | 455/260 |
| 5,519,885 | 5/1996 | Vaisanen | 455/76 |
| 5,732,330 | 3/1998 | Anderson et al. | 455/76 |
| 5,796,772 | 8/1998 | Smith et al. | 375/200 |

FOREIGN PATENT DOCUMENTS

| | | |
|---|---|---|
| 0 800 283 A2 | 10/1997 | European Pat. Off. . |
| WO 89/07865 | 8/1989 | WIPO . |
| WO 98/00927 | 1/1998 | WIPO . |

*Primary Examiner*—Nguyen Vo
*Assistant Examiner*—Charles N. Appiah
*Attorney, Agent, or Firm*—Robert A. Samra

[57] ABSTRACT

A dual band mobile station including a main channel synthesizer and an offset synthesizer for generating the transmit frequency and the receive intermediate frequency (IF) required for operation in each of two different bands characterized by different transmit-receive channel offsets. According to the present invention, the main channel synthesizer does not have to change its frequency when the mobile station switches between transmission and reception in either of the two bands so long as a common IF is selected for both bands, which is equal to one or the other of the channel offsets. This IF selection also allows for a reduction in the tuning range of the main channel synthesizer.

10 Claims, 5 Drawing Sheets

REV CH ... | A | B | C | A | B | C | ...

FWD CH ... | A | B | C | A | B | ...

... | TX | RX | MAHO | TX | RX | MAHO | ...

TX CELL BAND: 824.01 – 848.97
RX CELL BAND: 869.01 – 893.97
TX PCS BAND: 1850.01 – 1909.95
RX PCS BAND: 1930.05 – 1989.99

FREQUENCY (MHz)

| CELL BAND | BANDWIDTH (MHz) | NUMBER OF CHANNELS | BOUNDARY CHANNELS | TRANSMITTER CENTER FREQUENCY (MHz) | |
|---|---|---|---|---|---|
| | | | | MOBILE | BASE |
| (NOT USED) | | 1 | (990) | (824.010) | (869.010) |
| A" | 1 | 33 | 991 | 824.040 | 869.040 |
| | | | 1023 | 825.000 | 870.000 |
| A | 10 | 333 | 1 | 825.030 | 870.030 |
| | | | 333 | 834.990 | 879.990 |
| B | 10 | 333 | 334 | 835.020 | 880.020 |
| | | | 666 | 844.980 | 889.980 |
| A' | 1.5 | 50 | 667 | 845.010 | 890.010 |
| | | | 716 | 846.480 | 891.480 |
| B' | 2.5 | 83 | 717 | 846.510 | 891.510 |
| | | | 799 | 848.970 | 893.970 |

| PCS BAND | BANDWIDTH (MHz) | NUMBER OF CHANNELS | BOUNDARY CHANNELS | TRANSMITTER CENTER FREQUENCY (MHz) | |
|---|---|---|---|---|---|
| | | | | MOBILE | BASE |
| NOT USED | | 1 | 1 | 1850.010 | 1930.050 |
| A | 15 | 497 | 2<br>498 | 1850.040<br>1864.920 | 1930.080<br>1944.960 |
| A,D | | 1 | 499 | 1864.950 | 1944.990 |
| A,D | | 1 | 500 | 1864.980 | 1945.020 |
| A,D | | 1 | 501 | 1865.010 | 1945.050 |
| D | 5 | 164 | 502<br>665 | 1865.040<br>1869.930 | 1945.080<br>1949.970 |
| D,B | | 1 | 666 | 1869.960 | 1950.000 |
| D,B | | 1 | 667 | 1869.990 | 1950.030 |
| B | 15 | 498 | 668<br>1165 | 1870.020<br>1884.930 | 1950.060<br>1964.970 |
| B,E | | 1 | 1166 | 1884.960 | 1965.000 |
| B,E | | 1 | 1167 | 1884.990 | 1965.030 |
| E | 5 | 165 | 1168<br>1332 | 1885.020<br>1889.940 | 1965.060<br>1969.980 |
| E,F | | 1 | 1333 | 1889.970 | 1970.010 |
| E,F | | 1 | 1334 | 1890.000 | 1970.040 |
| F | 5 | 164 | 1335<br>1498 | 1890.030<br>1894.920 | 1970.070<br>1974.960 |
| F,C | | 1 | 1499 | 1894.950 | 1974.990 |
| F,C | | 1 | 1500 | 1894.980 | 1975.020 |
| F,C | | 1 | 1501 | 1895.010 | 1975.050 |
| C | 15 | 497 | 1502<br>1998 | 1895.040<br>1909.920 | 1975.080<br>1989.960 |
| NOT USED | | 1 | 1999 | 1909.950 | 1989.990 |

*FIG. 6*
(PRIOR ART)

DUAL BAND MOBILE STATION

BACKGROUND OF THE INVENTION

1. Field of the Invention

The present invention relates to wireless communication systems and, more particularly, to mobile stations which operate in two separate radio frequency (RF) bands such as those used for providing cellular telephone services and personal communication services (PCS), respectively.

2. Related Prior Art Systems

The architecture for a typical cellular radio system is shown in FIG. 1. A geographical area (e.g., a metropolitan area) is divided into several smaller, contiguous radio coverage areas, called "cells," such as cells C1–C10. The cells C1–C10 are served by a corresponding group of fixed radio stations, called "base stations," B1–B10, each of which includes a plurality of RF channel units (transceivers) that operate on a subset of the RF channels assigned to the system, as well known in the art. The RF channels allocated to any given cell (or sector) may be reallocated to a distant cell in accordance with a frequency reuse plan as is also well known in the art. In each cell, at least one RF channel is used to carry control or supervisory messages, and is called the "control" or "paging/access" channel. The other RF channels are used to carry voice conversations, and are called the "voice" or "speech" channels. The cellular telephone users (mobile subscribers) in the cells C1–C10 are provided with portable (hand-held), transportable (hand-carried) or mobile (car-mounted) telephone units, collectively referred to as "mobile stations," such as mobile stations M1–M5, each of which communicates with a nearby base station. Each of the mobile stations M1–M5 includes a controller (microprocessor) and a transceiver, as well known in the art. The transceiver in each mobile station may tune to any of the RF channels specified in the system (whereas each of the transceivers in the base stations B1–B10 usually operates on only one of the different RF channels used in the corresponding cell).

When turned on (powered up), each of the mobile stations M1–M5 enters the idle state (standby mode) and tunes to and continuously monitors the strongest control channel (generally, the control channel of the cell in which the mobile station is located at that moment). When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels in operation in the cellular system to find the "best" control channel. When a control channel with good reception quality is found, the mobile station remains tuned to this channel until the quality deteriorates again. In this manner, the mobile station remains "in touch" with the system and may receive or initiate a telephone call through one of the base stations B1–B10 which is connected to the MTSO 20.

With continuing reference to FIG. 1, the base stations B1–B10 are connected to and controlled by a mobile telephone switching office (MTSO) 20. The MTSO 20, in turn, is connected to a central office (not specifically shown in FIG. 1) in the landline (wireline) public switched telephone network (PSTN) 22, or to a similar facility such as an integrated system digital network (ISDN). The MTSO 20 switches calls between wireline and mobile subscribers, controls signalling to the mobile stations M1–M5, compiles billing statistics, stores subscriber service profiles, and provides for the operation, maintenance and testing of the system. An important function of the MTSO 20 is to perform a "handoff" of a call from one base station to another base station B1–B10 as one of the mobile stations M1–M5 moves between cells. The MTSO 20 monitors the quality of the voice channel in the old cell and the availability of voice channels in the new cell. When the channel quality falls below a predetermined level (e.g, as the user travels away from the old base station towards the perimeter of the old cell), the MTSO 20 selects an available voice channel in the new cell and then orders the old base station to send to the mobile station on the current voice channel in the old cell a handoff message which informs the mobile station to tune to the selected voice channel in the new cell.

The original cellular radio systems, as described generally above, used analog transmission methods, specifically frequency modulation (FM), and duplex (two-way) RF channels in accordance with the well known Advanced Mobile Phone Service (AMPS) standard. According to the AMPS standard, each control or voice channel between the base station and the mobile station uses a pair of separate frequencies consisting of a forward (down link) frequency for transmission by the base station (reception by the mobile station) and a reverse (uplink) frequency for transmission by the mobile station (reception by the base station). The AMPS system, therefore, is a single-channel-per-carrier (SCPC) system allowing for only one voice circuit (telephone conversation) per RF channel. Different users are provided access to the same set of RF channels with each user being assigned a different RF channel (pair of frequencies) in a technique known as frequency division multiple access (FDMA).

More recently, there has been a shift from analog to digital technology in order to increase the capacity of cellular systems and meet the needs of an ever growing subscriber base. The newer digital AMPS (D-AMPS) systems use digital voice encoding (analog-to-digital conversion and voice compression) and time division multiple access (TDMA) to multiply the number of voice circuits (conversations) which can be accommodated on an AMPS RF channel (i.e., to increase capacity). As shown in FIG. 2, in D-AMPS each of the forward and reverse RF channels is divided into repeating time slots which may be occupied by three different mobile stations (A, B and C). It will be noted that the corresponding transmit and receive slots for any mobile station are offset in time from each other by at least one time slot so that the mobile station will not have to transmit and receive at the same time (thus, in TDMA mode, unlike FDMA mode, it is not necessary to use a duplexer for separating the transmit and receive signals). From the perspective of any of the mobile stations (A, B or C), its time slots on the forward and reverse channels are organized as a repeating sequence of a transmit slot followed by a receive slot that is followed by a mobile assisted handoff (MAHO) slot, as shown in FIG. 3 (during the MAHO slot the mobile station performs signal quality measurements on RF channels designated by the system so as to assist the system in performing handoff).

Along with the recent shift to digital technology in cellular systems, there has been an increasing shift towards the use of lightweight pocket telephones by subscribers who desire to receive wireless service not only while driving but also while walking around in their homes or offices or in the public streets or meeting places. This desire is reflected in the emerging concept of "personal communication services" (PCS). The goal of PCS systems is to provide a user moving around, for example, inside an office building, a factory, a warehouse, a shopping mall, a convention center, an airport, or an open area with the ability to transmit and/or receive telephone calls, facsimile, computer data, and/or paging and text messages. PCS systems use digital technology (TDMA) as with D-AMPS systems, but generally operate on lower power and use smaller cellular structures (called "microcells" or "picocells") as compared with AMPS/D-AMPS systems. Furthermore, while AMPS/D-AMPS systems operate in the 800 MHz band reserved for cellular operators many years ago, PCS systems operate in the 1900 MHz band which was recently released for use by PCS operators in the United States.

The differences between the frequency plans for PCS and AMPS/D-AMPS systems are shown in FIGS. 4–6. Referring first to FIG. 4, the AMPS/D-AMPS band (hereinafter sometimes referred to as the "cell band") spans frequencies in the range 824–894 MHz, and consists of a transmit (mobile station to base station) band over the range 824–849 MHz and a corresponding receive (base station to mobile station) band over the range 869–894 MHz. The PCS band, on the other hand, spans frequencies in the range 1850–1990 MHz, and consists of a transmit (mobile station to base station) band over the range 1850–1910 MHz and a corresponding receive (base station to mobile station) band over the range 1930–1990 MHz. As shown in FIGS. 5–6, each of the RF channels in the cell and PCS bands is associated with a particular channel number and group (assigned to a particular operator), and consists of a carrier (center) frequency in the associated transmit band and a corresponding carrier frequency in the associated receive band. It will be seen that for both AMPS/DAMPS and PCS, the adjacent channel separation is 30 KHz. However, the transmit-receive (TX-RX) offset is 45 MHz for AMPS/D-AMPS and 80.04 MHz for PCS.

Thus, at present, different types of wireless systems are in use, including AMPS (analog/FDMA) and D-AMPS (digital/TDMA) systems operating in the 800 MHz band, and PCS systems operating in the 1900 MHz band. As a result, there is a need or a market for mobile stations which operate only in AMPS mode, "dual-mode" mobile stations which can operate in both AMPS and D-AMPS modes, and "dual-band" mobile stations which can operate in both the cell and PCS bands. The design of cost-effective transceivers for dual-band mobile stations, in particular, has proved to be difficult due to the relatively large frequency separation between the cell and PCS bands and the use of different TX-RX offsets in the two bands. Those difficulties may be better understood by reference to FIG. 7 which shows a typical design for a single band (e.g., AMPS/D-AMPS) transceiver.

Referring to FIG. 7, an incoming (received) signal in the 869–894 MHz range is passed through a band pass filter (BPF) 30 which attenuates out-of-band signals and noise. The output of the BPF 30 then is mixed with the output of a main channel synthesizer (first local oscillator) 32 in a mixer 34 to produce a pair of sum and difference frequencies, as well known in the art. These signal products are passed through a BPF 36 which filters out the (higher) sum frequency leaving only the difference (lower) frequency. The effect of this first mixing and filtering stage is to downconvert the received signal into a first intermediate frequency (IF) signal, which is presented at the output of the BPF 36. This first IF signal is further downconverted into a second IF signal by mixing it with the output of an auxiliary synthesizer (second local oscillator) 38 in a mixer 40, and then filtering the output of the mixer 40 in a BPF 42 so as to select the lower frequency from the mixer 40.

As also shown in FIG. 7, the main channel synthesizer 32 can be used in conjunction with a transmit offset synthesizer 44 (third local oscillator) to upconvert a baseband signal into a transmit signal in the desired 824–849 MHz range. The baseband signal may be comprised of in-phase (I) and quadrature (Q) components representative of a user speech signal (as well known in the art). During transmission, the output of the main channel synthesizer 32 is mixed with the output of the transmit offset synthesizer 44 in a mixer 46 to produce a pair of sum and difference frequencies that are modulated with the baseband signal in an IQ modulator 48. The output of the IQ modulator 48 then is passed through a BPF 50 so as to select the desired transmit frequency.

The transceiver of FIG. 7 can be configured to receive or transmit in any RF channel within the cell band by appropriate setting of the main channel synthesizer 32, the auxiliary synthesizer 38 and/or the transmit offset synthesizer 44. For example, if the desired transmit and receive frequencies are 824.04 MHz and 869.04 MHz, respectively, the main channel synthesizer 32 can be set to operate at 979.56 MHz. The mixer 34 will generate a sum frequency signal at 1848.6 and a difference frequency signal at 110.52 MHz. The higher frequency is filtered out in the BPF 36 and the lower frequency (first IF) is mixed with the output of the auxiliary synthesizer 38, which may be set to operate at 110.97 MHz. The mixer 40 will generate a sum frequency signal at 221.49 MHz and a difference frequency signal at 0.45 MHz (450 KHz). The higher frequency is filtered out in the BPF 42 and the lower frequency (second IF) is delivered for further IF processing (not shown).

In the transmit direction, the transmit offset synthesizer 44 may be set to operate at 155.52 MHz. This 155.52 MHz signal is mixed with the 979.56 MHz signal from the main channel synthesizer 32 in the mixer 46 which generates a sum frequency signal at 1135.08 MHz and a difference frequency signal at 824.04 MHz. After modulation in the IQ modulator 48, the higher frequency (and other harmonics) can be filtered out in the BPF 50 leaving the desired transmit frequency at 824.04 MHz for delivery to an antenna (not shown in FIG. 7).

It will be readily appreciated that by setting the main channel synthesizer 32 within the range 979.56–1004.49 MHz all of the desired transmit and IF frequencies for cell band operation can be generated in the manner described above (with the transmit offset synthesizer 44 set to 155.52 MHz and the first IF fixed at 110.52 MHz for all transmit and receive frequencies).

The basic transceiver design as shown in FIG. 7 and illustrated above for AMPS/D-AMPS operation can also be used for operation in the PCS band. However, for dual band operation, such a design requires the use of two separate AMPS/D-AMPS and PCS transceivers having different synthesizers 32, 38 and 44 due to the substantially different frequency ranges and the substantially different TX-RX offsets for the cell and PCS bands, respectively. For a dual band mobile station, such a design may not be cost effective or practical since it requires the use of a total of six different synthesizers, which would increase the cost, size and current drain of the mobile station.

One approach to minimizing the transceiver hardware required for dual band operation is shown in FIG. 8. This approach contemplates the sharing of hardware between the cell band and PCS band operations. According to this approach, the main channel synthesizer 32 is used to generate a local oscillator (LO) signal for downconverting a received signal in the cell band into an intermediate frequency (IF) signal. The output of the main channel synthesizer 32 is also mixed with the output of the offset synthesizer 44 in a mixer 52 to generate an LO signal at the output of a band pass filter (BPF) 54 for upconverting a source signal for transmission in the cell band. In PCS mode, the output of the BPF 54 is mixed with the output of the main channel synthesizer 32 in a mixer 56 to produce an LO signal at the output of a BPF 58 for upconverting a source signal for transmission in the PCS band. To downconvert a received PCS signal into an IF signal, the frequency of the main channel synthesizer 32 can be doubled in a frequency doubler 60 and used as the receive LO signal. It will be appreciated that the transceiver design shown in FIG. 8 reduces the required hardware for dual band operation by using the output of the main channel synthesizer 32 as the main LO signal for cell band operation and by remixing or doubling of this LO signal for PCS band operation, thus taking advantage of the fact that the PCS band is roughly twice the frequencies of the receive cell band.

The desired frequencies in the cell and PCS bands can be generated in the circuit of FIG. 8 by setting the offset channel synthesizer 44 to a frequency of 155.52 MHz and by tuning the main channel synthesizer 44 to frequencies in the range 979.56–1004.49 MHz and 1002.78–1050.255 MHz for operation in the cell band and PCS band, respectively. Thus, for example, the transmit and receive (first) IF frequencies at the upper and lower edges of the cell and PCS bands can be generated as follows (all numbers in MHz):

TX Cell Band:
979.56−155.52=824.04
1004.49−155.52=848.97
RX IF Cell Band:
979.56−869.04=110.52
1004.49−893.97=110.52
TX PCS Band:
1002.78−155.52+1002.78=1850.04
1032.735−155.52+1032.735=1909.95
RX IF PCS Band:
(1020.3×2)−1930.08=110.52
(1050.255×2)−1989.99=110.52

It will be seen that while the approach of FIG. 8 reduces hardware requirements for dual band operation (as well as providing for a common IF (at 110.52 MHz), which simplifies IF processing), it imposes certain design requirements on the voltage controlled oscillator (VCO) and the loop filter in the main channel synthesizer 32 (as well known in the art, a frequency synthesizer such as the main channel synthesizer 32 is comprised of a VCO which is tuned in a phase locked loop including a loop filter for passing an error voltage input signal to the VCO). Specifically, the VCO in the main channel synthesizer 32 of FIG. 8 must be tunable within a greater-than-70-MHz range (979.56–1050.255 MHz). As will be readily recognized by persons of ordinary skill in the art, such a wide tuning range may be difficult to implement in practice and may also increase the phase noise and the oscillator gain (ratio of output frequency change to input tuning voltage) of the VCO in the main channel synthesizer 32. These effects, in turn, could lead to the generation of excess noise signals outside the designated 30 KHz channel bandwidth. These "out-of-channel" signals may have sufficient energy to cause radio interference with adjacent channels.

In addition, it will be observed that in the PCS mode the main channel synthesizer 32 in FIG. 8 must "hop" between two different frequencies (e.g., 1002.78 MHz and 1020.3 MHz) when switching between transmit and receive modes. In a typical TDMA system (as illustrated in FIG. 3), a mobile station may have to transition from the transmit slot to the receive slot in as little as 1.8 ms or less. Therefore, the main channel synthesizer 32 in FIG. 8 must be "fast locking" (i.e., able to move from one frequency and settle at another frequency very quickly). As will be readily recognized by persons of ordinary skill in the art, a faster locking time requires the use of wider loop filter in the main channel synthesizer 32 which, in turn, may result in increased phase noise at the output of the VCO and, consequently, in the modulated transmit signal.

In light of the shortcomings of the prior art, there is a need for a dual band transceiver architecture which allows the VCO in the main channel synthesizer 32 to operate in a narrower tuning range and to remain at the same frequency when switching between transmit and receive modes. As will be seen below, such an advantageous architecture is provided by the present invention.

SUMMARY OF THE INVENTION

In one aspect, the present invention provides a mobile station which operates in first and second radio frequency (RF) bands, each band comprising pairs of transmit and receive RF channels, the frequencies of the transmit and receive channels in any pair in the first band being separated by a first channel offset and the frequencies of the transmit and receive channels in any pair in the second band being separated by a second channel offset. The mobile station comprises a main frequency synthesizer for generating a main signal; an offset frequency synthesizer for generating an offset signal; means for combining the main signal with the offset signal to produce a signal corresponding to a selected transmit RF channel in the first band; means for combining the main signal with a signal corresponding to a receive RF channel, that is paired with the selected transmit RF channel in the first band, to produce an intermediate frequency (IF) signal having a frequency $f_1$; means for scaling the frequency of the main signal to produce a scaled signal corresponding to a selected transmit RF channel in the second band; means for combining the scaled signal with a signal corresponding to a receive RF channel, that is paired with the selected transmit RF channel in the second band, to produce an IF signal having a frequency $f_2$; and means for programming the main and offset synthesizers such that the $f_1$ and $f_2$ frequencies are both equal to either the first or the second channel offset thereby allowing the main synthesizer to remain at the same frequency when operating on any pair of transmit and receive channels in the first or second band. This mobile station can be used, for example, where the first and second bands are the cell and PCS bands, respectively.

In another aspect, the present invention provides a method of operating a mobile station in first and second radio frequency (RF) bands, each band comprising pairs of transmit and receive RF channels, the frequencies of the transmit and receive channels in any pair in the first band being separated by a first channel offset and the frequencies of the transmit and receive channels in any pair in the second band being separated by a second channel offset. The method comprises the steps of generating a main frequency signal in the mobile station; generating an offset frequency signal in the mobile station; if the mobile station is to be operated in the first band, combining the main signal with the offset signal to produce a signal corresponding to a selected transmit RF channel in the first band; if the mobile station is to be operated in the first band, combining the main signal with a signal corresponding to a receive RF channel, that is paired with the selected transmit RF channel in the first band, to produce an intermediate frequency (IF) signal having a frequency $f_1$; if the mobile station is to be operated in the second band, scaling the frequency of the main signal to produce a scaled signal corresponding to a selected transmit RF channel in the second band; if the mobile station is to be operated in the second band, combining the scaled signal with a signal corresponding to a receive RF channel, that is paired with the selected transmit RF channel in the second band, to produce an IF signal having a frequency $f_2$; and selecting the frequencies of the main and offset signals so that the $f_1$ and $f_2$ frequencies are both equal to either the first or the second channel offset. In this method, as before, the first and second bands can be the cell and PCS bands, respectively.

These and other aspects, objects and advantages of the present invention will become readily apparent from the accompanying drawings and the detailed description of the invention as set forth below.

BRIEF DESCRIPTION OF THE DRAWINGS

The present invention will be better understood and its numerous objects and advantages will become apparent to those skilled in the art by reference to the following drawings in which:

FIG. 6 shows the RF channel allocation within the PCS frequency band(s) of FIG. 4;

DETAILED DESCRIPTION

Figure 9:
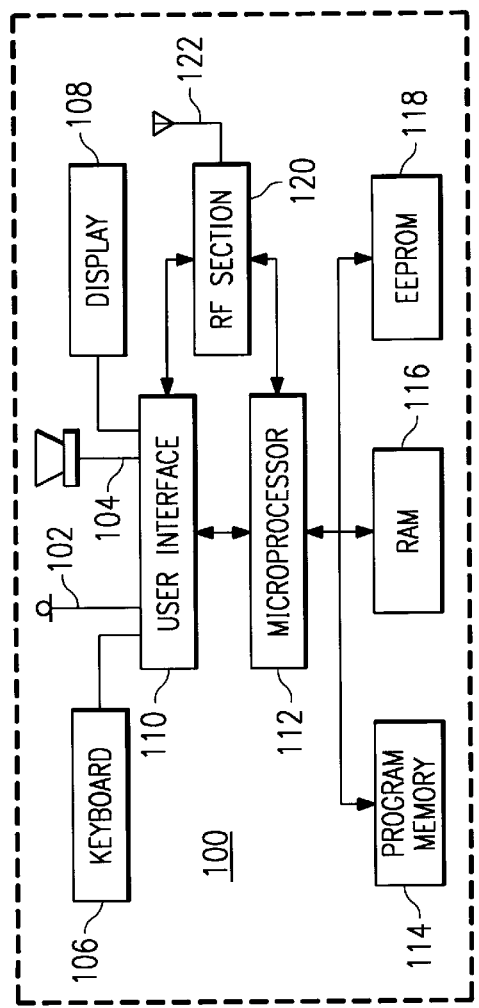
FIG. 9 is a block diagram of a mobile station which may be used in accordance with the present invention.

Referring now to FIG. 9, there is shown a simplified block diagram of an exemplary mobile station 100 which may be used in accordance with the present invention. The mobile station 100 comprises a microphone 102, a loudspeaker 104, a keyboard or keypad 106, an alphanumeric or graphical display 108, a user interface 110, a microprocessor 112, a program memory 114, a random access memory (RAM) 116, an electrically erasable programmable read only memory (EEPROM) 118, a radio frequency (RF) section 120 and an antenna 122.

The user interface 110 includes speech and data processing circuitry (not specifically shown) such as a codec for performing analog-to-digital (A/D) conversion of a transmit speech signal from the microphone 102 and digital-to-analog (D/A) conversion of a received speech signal destined for the loudspeaker 104. The user interface 110 further includes a digital signal processor (DSP) for performing gain/attenuation, filtering, compression/decompression, channel coding/decoding and any other desired processing (e.g., in accordance with the applicable AMPS/D-AMPS or PCS standard) of speech and user or control data. In the preferred embodiment, the user interface 110 supplies in-phase (I) and quadrature (Q) modulation waveforms to the RF section 120.

The microprocessor 112 controls the overall operation of the mobile station 100 through software programs stored in the program memory 114. These programs may include, for example, executable instructions for each of the transmit and receive operations on the digital control channel (DCCH) and the digital traffic channel (DTCH) as specified, for example, in the industry standard known as IS-136. The RAM 116 holds the values of temporary variables used in the execution of these instructions. Parameters whose values must be preserved after power is turned off in the mobile station 100 may be stored in the EEPROM 118 (or in a similar non-volatile or flash memory). Such parameters may include, for example, the mobile identification number (MIN), the electronic serial number (ESN) of the mobile station 100, and the system identification of the home system (SIDH) of the mobile station 100.

Generally speaking, the RF section 120 includes RF processing circuitry (not specifically shown in FIG. 9) such as an RF transmitter for modulating the I and Q data onto an analog carrier signal, upconverting the modulated signal to the selected channel frequency and then amplifying and transmitting the signal through the antenna 122. The RF section 120 further includes an RF receiver for downconverting a modulated signal received through the antenna 122 into at least one intermediate frequency (IF) signal that may be then demodulated before being processed in the DSP.

Figure 10:
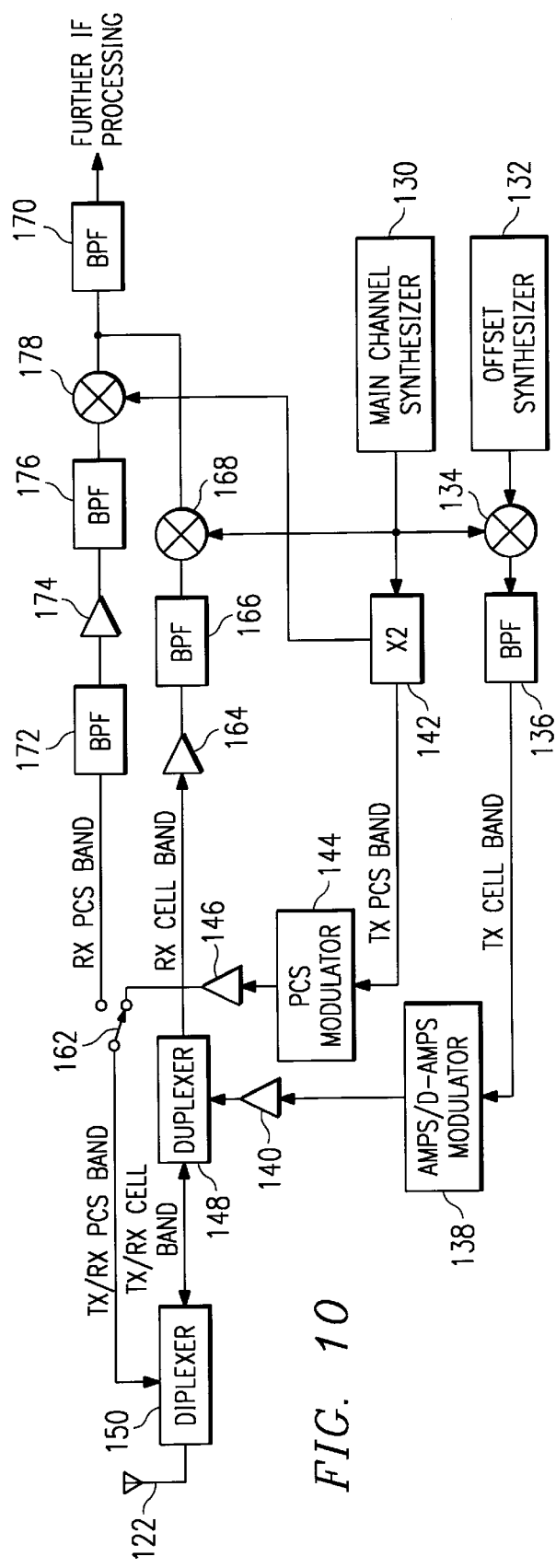
FIG. 10 is a circuit diagram of an exemplary construction of the RF section in FIG. 9, as taught by the present invention.

FIG. 10 shows a more detailed circuit diagram of the RF section 120 as provided by the present invention. For purposes of clarity, the paths for the transmit and receive cell band and PCS band signals have been labelled as appropriate. As shown in FIG. 10, the RF section 120 includes only two frequency synthesizers, a main channel synthesizer 130 and an offset synthesizer 132, the settings of which are controlled by the microprocessor 112 (FIG. 9). When the mobile station 100 is transmitting in the cell band, the outputs of the main channel synthesizer 130 and offset synthesizer 132 are combined in a mixer 134 to generate the desired transmit carrier signal. The output of the mixer 134 is then filtered in a band pass filter (BPF) 136 to remove any noise or spurious signals as well as the undesired signal products generated in the mixer 134. The desired signal from the BPF 136 is modulated in an AMPS/D-AMPS modulator 138 with an input information signal (e.g., IQ speech signal) from the user interface 110 (FIG. 9). The modulated signal is then supplied to a power amplifier 140 to increase the power of the transmit cell band signal to the desired level. The output of the power amplifier 140 is provided to a duplexer 148 and then to a diplexer 150 for transmission through the antenna 122.

As will be appreciated by persons of ordinary skill in the art, the duplexer 148 can be used to separate the cell band transmit signal from the incoming cell band receive signal so that the transmit and receive signals can be applied to the appropriate paths. The diplexer 150, on the other hand, can be used to separate the cell band transmit and receive signals from the PCS band transmit and receive signals so that the cell band and PCS band signals can be applied to the appropriate paths. As well known in the art, each of the duplexer 148 and the diplexer 150 may be implemented with a plurality of BPFs.

When the mobile station 100 is receiving in the cell band, the received signal is supplied from the antenna 122 through the diplexer 150 to the duplexer 148. The output of the duplexer 148 is amplified in a linear amplifier 164 and then filtered in a BPF 166 which attenuates out-of-band noise (including noise introduced by the linear amplifier 164) and other spurious signals. The output of the BPF 166 is fed to a mixer 168 which combines the received cell band signal with the signal from the main channel synthesizer 130 to generate the desired first intermediate frequency (IF) signal. The output of the mixer 168 is then filtered in BPF 170 to remove any noise or spurious signals as well as the undesired signal products generated in the mixer 168. The output of the BPF 170 is then provided for further IF processing and downconversion into a baseband audio signal that is forwarded to the user interface 10 (FIG. 9).

Figure 1:
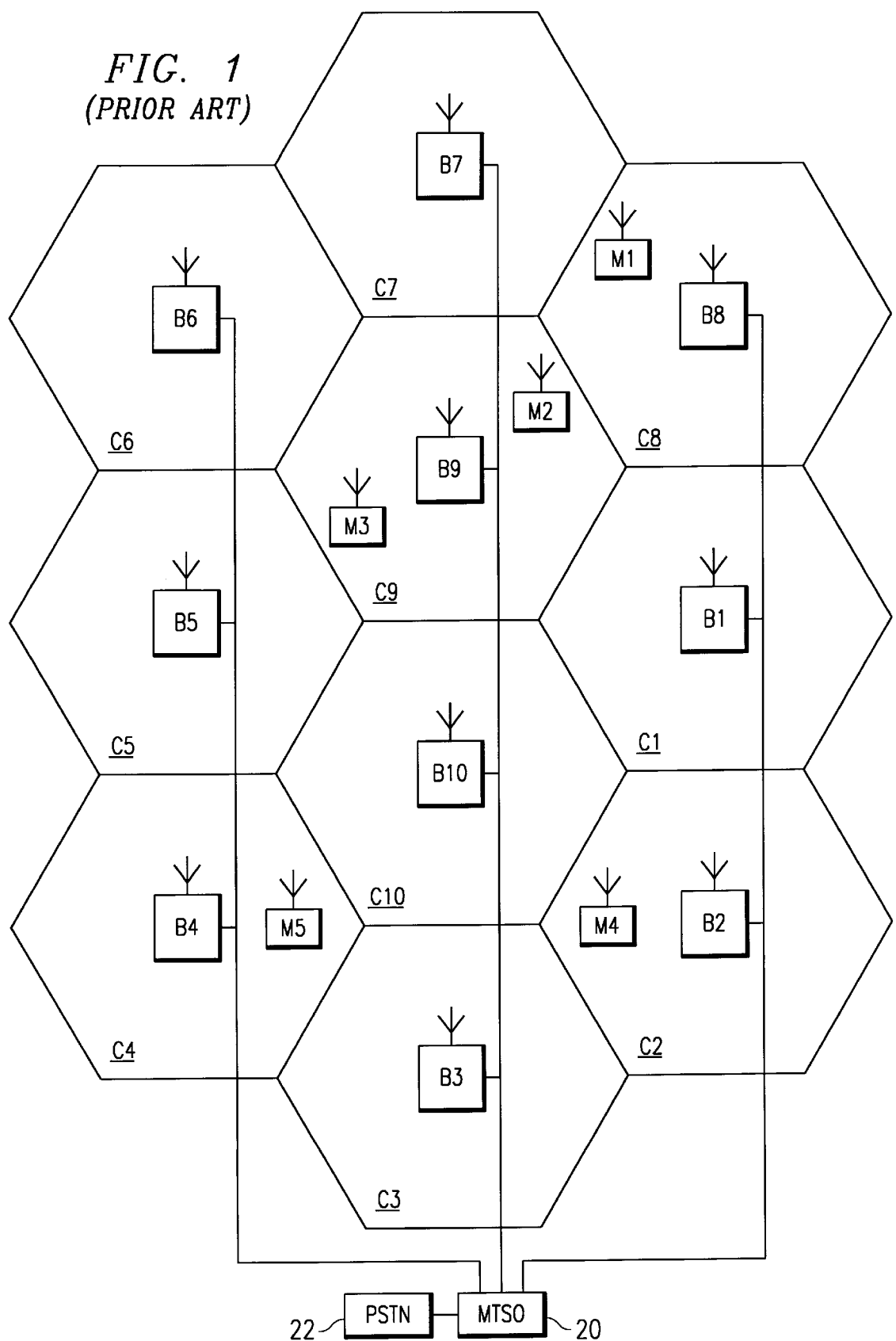
FIG. 1 shows the architecture of a conventional cellular radio system including a plurality of mobile stations and base stations communicating over a plurality of radio frequency (RF) channels.
Figures 2, 3, 4, 5:
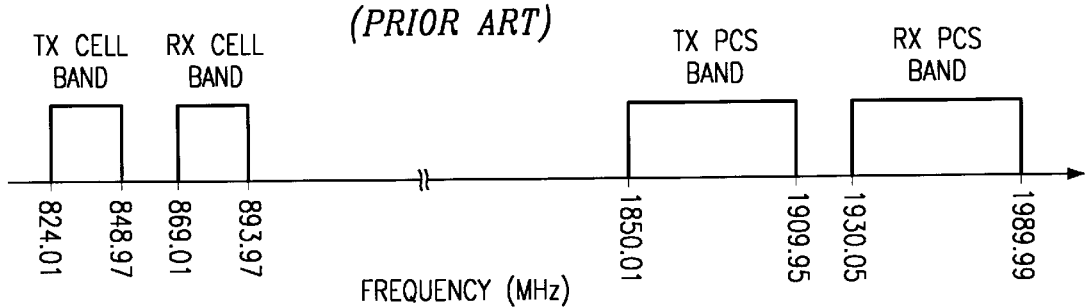
FIG. 2 shows a time division multiple access (TDMA) format for the forward (base station to mobile station) and reverse (mobile station to base station) RF channels in the system of FIG. 1.
FIG. 3 shows the TDMA sequence from the perspective of one of the mobile stations in FIG. 1.
FIG. 4 shows the transmit and receive frequency bands for cellular systems and communication services (PCS) systems as specified in known industry standards.
FIG. 5 shows the RF channel allocation within the cellular frequency band(s) of FIG. 4.
Figure 7:
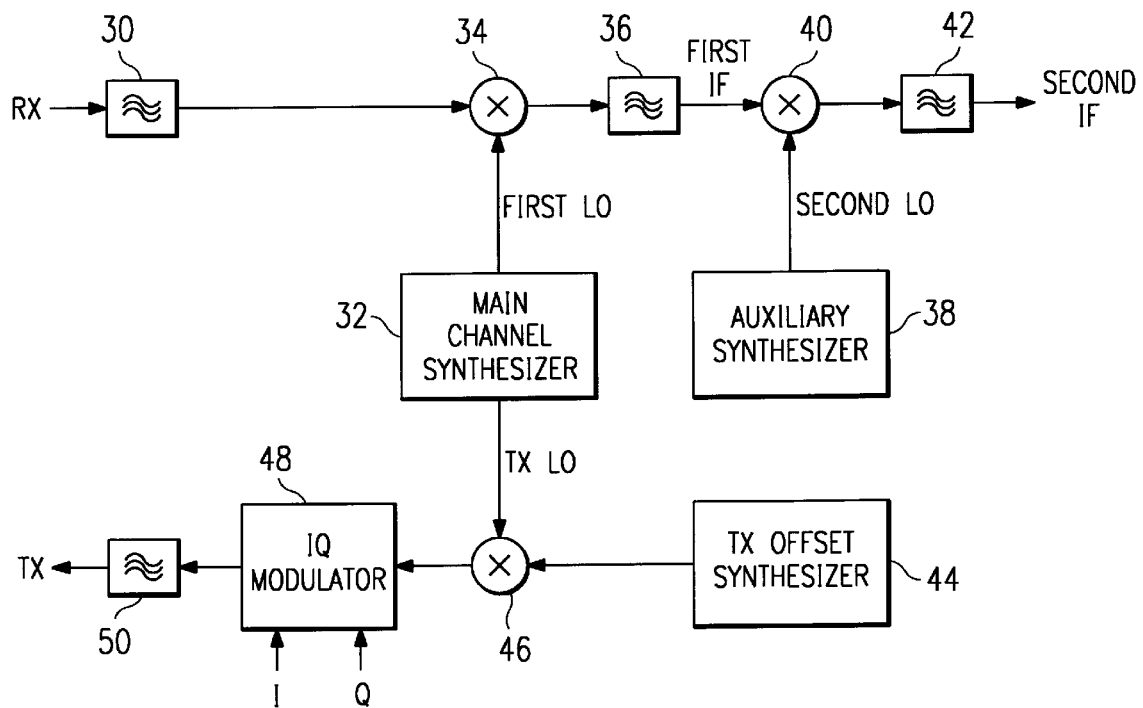
FIG. 7 is a block diagram of a single band transceiver which can be used in a mobile station operating in either the cellular band or the PCS band (but not both)
Figure 8:
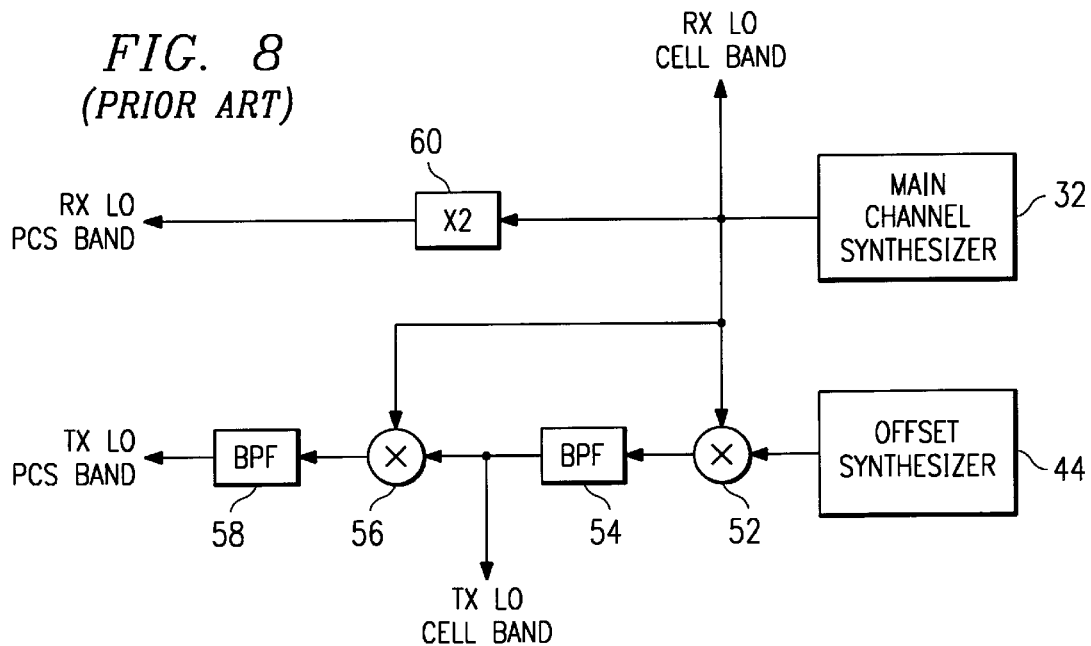
FIG. 8 is a simplified block diagram of a dual band transceiver which can be used in a mobile station operating in both the cellular band and the PCS band.

With continuing reference to FIG. 10, when the mobile station 100 is transmitting in the PCS band, the output of the main channel synthesizer 130 is fed to a frequency doubler 142 which generates the desired transmit carrier signal in the PCS band. The output of the frequency doubler 142 is modulated in a PCS modulator 144 with an input information signal (e.g., IQ speech signal) from the user interface 110 (FIG. 9). The modulated signal is then supplied to a power amplifier 146 to increase the power of the transmit PCS band signal to the desired level. The output of the power amplifier 146 is supplied to a switch 162 which directs the transmit signal to the diplexer 150 during the transmit time slots defined in a TDMA system (as shown in FIG. 3).

When the mobile station 100 is receiving in the PCS band, the received signal is directed by the switch 162 to a BPF 172 which is used to filter out signal components outside of the PCS band. The output of the BPF 172 is amplified in a linear amplifier 174 and filtered in a BPF 176 which further attenuates out-of-band noise (including noise introduced by the linear amplifier 174) and other spurious signals. The output of the BPF 176 is now fed to a mixer 178 which combines the received PCS band signal with the signal from the frequency doubler 142 to generate the desired first IF signal. The output of the mixer 178 is then passed through the BPF 170 to filter out the undesired signals and the output of the BPF 170 is supplied for further IF processing and downconversion in a manner similar to the received cell band signal.

According to the present invention, the main channel synthesizer 130 can be set to the same frequency during both the transmit and receive operations in either the cell band or the PCS band by appropriate selection of the common (first) IF at the output of the BPF 170. More specifically, the present invention recognizes that if this IF is selected to be equal to the transmit-receive (TX-RX) offset for either the cell band or the PCS band and if the main channel synthesizer 130 and the offset synthesizer 132 are appropriately programmed, the main channel synthesizer 130 will not have to hop frequencies when switching between the transmit and receive operations in either the cell band or PCS band. An additional benefit of this IF selection criteria is a reduction in the tuning range of the main channel synthesizer 130. These benefits will now be illustrated below.

As described previously, the TX-RX offsets for the cell band and the PCS band are 45 MHz and 80.04 MHz, respectively. Thus, according to the present invention, the IF in FIG. 10 can be selected to be either 45 MHz or 80.04 MHz. The choice between these two values will usually be based on receiver parameters such as the desired half-IF, intermodulation rejection (IMR) or RF or IF filter bandwidths, as will be appreciated by persons of ordinary skill in the art. In the illustration which follows, it is assumed that the IF has been chosen as 80.04 MHz. Examples are then given for the mobile station 100 operating on the boundary channels in the cell band and PCS band.

Assume first that the mobile station 100 is operating on channel 991 in the cell band, which corresponds to a transmit frequency of 824.04 MHz and a receive frequency of 869.04 MHz (FIG. 5). The main channel synthesizer 130 is programmed to a frequency of 949.08 MHz and the offset synthesizer 132 is set to a frequency of 125.04 MHz, which is the sum of the TX-RX offsets for the cell and PCS bands, respectively. During the transmit operation, the outputs of the two synthesizers 130 and 132 are combined in the mixer 134 to produce sum and difference frequencies of 1074.12 MHz and 824.04 MHz, respectively. The higher frequency at 1074.12 MHz is filtered out in the BPF 136 leaving the desired transmit frequency at 824.04 MHz. During the receive operation, the mixer 168 combines the incoming signal at 869.04 MHz with the signal at 949.08 MHz from the main channel synthesizer 130 to produce sum and difference frequencies of 1818.12 MHz and 80.04 MHz, respectively. The higher frequency at 1818.12 MHz is filtered out in the BPF 170 leaving the desired IF at 80.04 MHz. In a similar manner, it can be easily shown that if the mobile station 100 is operating on channel 799 in the cell band, the desired transmit frequency at 848.97 MHz and the desired receive IF frequency at 80.04 MHz can be obtained by programming the main channel synthesizer 130 to a frequency of 974.01 MHz with the offset synthesizer 132 set to a frequency of 125.04 MHz.

Assume next that the mobile station 100 is operating on channel 2 in the PCS band, which corresponds to a transmit frequency of 1850.04 MHz and a receive frequency of 1930.08 MHz (FIG. 6). The main channel synthesizer 130 is programmed to a frequency of 925.02 MHz and the offset synthesizer 132 is turned off. During the transmit operation, the frequency of the signal from the main channel synthesizer 130 is doubled in the frequency doubler 142 thus producing the desired transmit signal at 1850.04 MHz. During the receive operation, the mixer 178 combines the incoming signal at 1930.08 MHz with the signal at 1850.04 MHz from the frequency doubler 142 to produce sum and difference frequencies of 3780.12 MHz and 80.04 MHz, respectively. The higher frequency at 3780.12 MHz is filtered out in the BPF 170 leaving the desired IF at 80.04 MHz. In a similar manner, it can be easily shown that if the mobile station 100 is operating on channel 1998 in the PCS band, the desired transmit frequency at 1909.92 MHz and the desired receive IF frequency at 80.04 MHz can be obtained by programming the main channel synthesizer 130 to a frequency of 954.96 MHz with the offset synthesizer 132 set to a frequency of 125.04 MHz.

As illustrated above, the present invention allows the main channel synthesizer 130 to remain at the same frequency when switching between transmit and receive for any channel in the cell band or PCS band. Furthermore, it will be appreciated that the tuning range of the main channel synthesizer 130 of the present invention (925.02–974.01 MHz) is substantially lower than for the main channel synthesizer 32 of the prior art (whose tuning range is greater than 70 MHz, as described earlier).

It will be appreciated that many operational or structural modifications may be made by persons of ordinary skill to the basic circuit of FIG. 10. For example and without limitation, the mixer 134 and BPF 136 can be moved from the input side to the output side of the AMPS/D-AMPS modulator 138 without affecting the operation of the circuit. In this case, the AMPS/D-AMPS modulator 138 would receive one of the signals from the main channel synthesizer 130 and the offset synthesizer 132 (in addition to receiving the information signal) while the mixer 134 would receive the other signal (in addition to receiving the modulated signal from the AMPS/D-AMPS modulator 138). Preferably in that event, the signal from the main channel synthesizer 130 is fed to the mixer 134 and the signal from the offset channel synthesizer 132 is fed to the AMPS/D-AMPS modulator 138 so that the modulation of the information signal occurs at a lower frequency (thus resulting in fewer undesirable signal products).

As another example of a possible variation on the circuit of FIG. 10, an image reject mixer could be used for implementing the functions of the mixer 134 and the BPF 136 so that only the desired difference frequency is supplied from the image mixer to the AMPS/D-AMPS modulator 138. As yet another example of a possible circuit modification, the frequency doubling function of the frequency doubler 142 in FIG. 10 may be accomplished with a mixer which receives the output of the main channel synthesizer 130 at each of its two inputs.

In general, those skilled in the art will readily recognize that many other modifications and variations may be made to the embodiments of the present invention disclosed herein without substantially departing from the spirit and scope of the present invention. Accordingly, the form of the invention disclosed herein is exemplary and is not intended as a limitation on the scope of the invention as defined in the following claims.

We claim:

1. A mobile station which operates in first and second radio frequency (RF) bands, each band comprising pairs of transmit and receive RF channels, the frequencies of the transmit and receive channels in any pair in said first band being separated by a first channel offset and the frequencies of the transmit and receive channels in any pair in said second band being separated by a second channel offset, the mobile station comprising:

a main frequency synthesizer for generating a main signal;

an offset frequency synthesizer for generating an offset signal;

means for combining said main signal with said offset signal to produce a signal corresponding to a selected transmit RF channel in said first band;

means for combining said main signal with a signal corresponding to a receive RF channel, that is paired with said selected transmit RF channel in said first band, to produce an intermediate frequency (IF) signal having a frequency $f_1$;

means for scaling the frequency of said main signal to produce a scaled signal corresponding to a selected transmit RF channel in said second band;

means for combining said scaled signal with a signal corresponding to a receive RF channel, that is paired with said selected transmit RF channel in the second band, to produce an IF signal having a frequency $f_2$; and means for programming said main and offset synthesizers such that said $f_1$ and $f_2$ frequencies are both equal to either said first or said second channel offset thereby allowing said main synthesizer to remain at the same frequency when operating on any pair of transmit and receive channels in said first or second band.

2. The mobile station of claim 1 wherein said first band is used by cellular systems and said second band is used by personal communication services (PCS) systems.

3. The mobile station of claim 2 wherein said first band is in the 824–894 MHz range, said second band is in the 1850–1990 MHz range and said first and second channel offsets are 45 MHz and 80.04 MHz, respectively.

4. The mobile station of claim 3 wherein said main synthesizer is tuned within the 925.02–974.01 MHz range and said offset synthesizer is set to 125.04 MHz.

5. The mobile station of claim 3 wherein said scaling means comprises means for doubling the frequency of said main signal.

6. A method of operating a mobile station in first and second radio frequency (RF) bands, each band comprising pairs of transmit and receive RF channels, the frequencies of the transmit and receive channels in any pair in said first band being separated by a first channel offset and the frequencies of the transmit and receive channels in any pair in said second band being separated by a second channel offset, the method comprising:

generating a main frequency signal in said mobile station;

generating an offset frequency signal in said mobile station;

if said mobile station is to be operated in said first band, combining said main signal with said offset signal to produce a signal corresponding to a selected transmit RF channel in said first band;

if said mobile station is to be operated in said first band, combining said main signal with a signal corresponding to a receive RF channel, that is paired with said selected transmit RF channel in said first band, to produce an intermediate frequency (IF) signal having a frequency $f_1$;

if said mobile station is to be operated in said second band, scaling the frequency of said main signal to produce a scaled signal corresponding to a selected transmit RF channel in said second band;

if said mobile station is to be operated in said second band, combining said scaled signal with a signal corresponding to a receive RF channel, that is paired with said selected transmit RF channel in the second band, to produce an IF signal having a frequency $f_2$; and selecting the frequencies of said main and offset signals so that said $f_1$ and $f_2$ frequencies are both equal to either said first or said second channel offset.

7. The method of claim 6 wherein said first band is used by cellular systems and said second band is used by personal communication services (PCS) systems.

8. The method of claim 7 wherein said first band is in the 824–894 MHz range, said second band is in the 1850–1990 MHz range and said first and second channel offsets are 45 MHz and 80.04 MHz, respectively.

9. The method of claim 8 wherein the frequency of said main signal is within the 925.02–974.01 MHz range and the frequency of said offset signal is 125.04 MHz.

10. The method of claim 8 wherein the frequency of said scaled signal is twice the frequency of said main signal.

* * * * *